United States Patent
Gupta

(10) Patent No.: US 11,064,436 B2
(45) Date of Patent: Jul. 13, 2021

(54) WIRELESS NETWORK CONTROLLERS WITH MACHINE LEARNING

(71) Applicant: HEWLETT-PACKARD DEVELOPMENT COMPANY, L.P., Spring, TX (US)

(72) Inventor: Mohit Gupta, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/638,210

(22) PCT Filed: Oct. 17, 2017

(86) PCT No.: PCT/US2017/056993
§ 371 (c)(1),
(2) Date: Feb. 11, 2020

(87) PCT Pub. No.: WO2019/078825
PCT Pub. Date: Apr. 25, 2019

(65) Prior Publication Data
US 2020/0367164 A1    Nov. 19, 2020

(51) Int. Cl.
*H04W 52/02* (2009.01)
*G06N 5/02* (2006.01)
(Continued)

(52) U.S. Cl.
CPC ...... *H04W 52/0229* (2013.01); *G06N 3/0427* (2013.01); *G06N 5/025* (2013.01); *H04W 52/0241* (2013.01)

(58) Field of Classification Search
CPC ............. H04W 76/00; H04W 52/0254; H04W 52/0251; H04W 52/02; H04W 52/0229;
(Continued)

(56) References Cited

U.S. PATENT DOCUMENTS 8,570,993 B2    10/2013    Austin et al.
8,781,479 B2    7/2014    Mao et al.
(Continued)

FOREIGN PATENT DOCUMENTS

EP    2830366 A1    1/2015
WO    WO-9921102 A1    4/1999
(Continued)

OTHER PUBLICATIONS

Zheng, A et al., Automatic Wireless Activation in the Presence of Saved Networks, Mar. 17, 2017, https://www.tdcommons.org/dpubs_series/423.

*Primary Examiner* — Pablo N Tran
(74) *Attorney, Agent, or Firm* — Perry + Currier Inc.

(57) ABSTRACT

An example of an apparatus including a memory to store training data and rules. The apparatus includes a network interface to communicate with a wireless network. The apparatus also include a network detector to detect a presence of the wireless network. The apparatus includes a machine learning engine in communication with the memory. The machine learning engine is to use the training data to generate rules to determine if the network interface is to be switched from the power-saving state to the powered state in the presence of the wireless network. The apparatus also includes a processor to switch the network interface from the power-saving state to the powered state based on the rules.

15 Claims, 4 Drawing Sheets

(51) Int. Cl.
*G06F 9/46* (2006.01)
*H04L 29/08* (2006.01)
*G06N 3/04* (2006.01)

(58) Field of Classification Search
CPC ... H04W 52/0241; G06N 5/00; G06N 3/0427;
G06N 5/025; Y02D 30/70
See application file for complete search history.

(56) References Cited

U.S. PATENT DOCUMENTS

| | | | |
|---|---|---|---|
| 9,107,197 B2* | 8/2015 | Willars | H04W 76/20 |
| 9,921,559 B2* | 3/2018 | Tsubota | G05B 19/00 |
| 10,270,609 B2* | 4/2019 | Saxena | G05B 15/02 |
| 2009/0316654 A1* | 12/2009 | Prakash | H04W 36/0088 |
| | | | 370/331 |
| 2013/0326251 A1 | 12/2013 | Adewale | |
| 2015/0117411 A1 | 4/2015 | Jeong et al. | |
| 2016/0358065 A1* | 12/2016 | Gedge | G06N 20/00 |
| 2017/0013667 A1 | 1/2017 | Yang | |

FOREIGN PATENT DOCUMENTS

| WO | WO-2010030945 A1 | 3/2010 |
|---|---|---|
| WO | WO-2016137552 A1 | 9/2016 |

* cited by examiner

WIRELESS NETWORK CONTROLLERS WITH MACHINE LEARNING

BACKGROUND

Mobile computing devices such as smartphones, tablets, laptop computers, wearables, head mounted displays, etc. generally have the capability to access multiple networks, such as a wireless network and a cellular data network. Users of the mobile computing devices may manually turn off the access a network, such as a wireless network to avoid automatic connections to slow, unreliable or potentially malicious networks, conserving battery, etc. Users may subsequently forget to reconnect to the network when the connection is no longer unreliable, which leads to the mobile computing device utilizing another network, such as the cellular data network.

BRIEF DESCRIPTION OF THE DRAWINGS

Reference will now be made, by way of example only, to the accompanying drawings in which.

DETAILED DESCRIPTION

Mobile computing devices that have capability to connect to a network, such as a Wi-Fi network, enabled automatically connects to known networks. Automatic connection is generally performed even when the network is a low-quality network or a nonfunctional network, such as a Wi-Fi network without an Internet connection. In such circumstances, a user often turns off the mobile computing device's capability to connect to the network when the mobile computing device leaves a location, such as home, work, etc. If the mobile computing device's capability to connect to the network is turned off, the user device avoids automatic connection to low-quality networks, a nonfunctional network, or potentially malicious networks. Furthermore, when the mobile computing device's capability to connect to more networks is turned off, battery is conserved since specific electrical components no longer need to be powered within the mobile computing device. However, the mobile computing device's capability to connect to the network can remain unintentionally de-activated upon return to the familiar locations, which may lead to unintended usage surcharges from other networks, such as cellular data networks.

In addition, it is to be appreciated by a person of skill in the art with the benefit of this description that in some instances, a mobile computing device that is not connected to a network, such as a Wi-Fi network, may consume more power to maintain an Internet connection with an alternative network, such as a cellular network, that consumes more power to remain connected. Accordingly, keeping the capability to connect to the network turned off within the range of a lower power consuming network can deplete the batteries of the mobile computing device at a faster rate.

Figure 1:
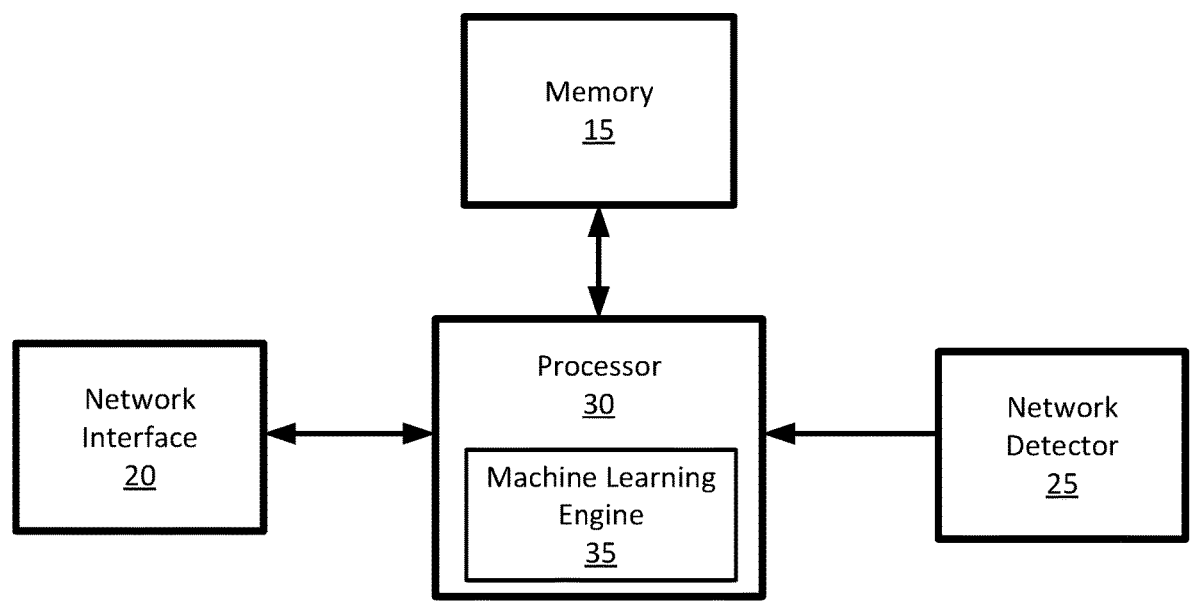
FIG. 1 is a block diagram of an example apparatus.
Figure 1:
Figure 2:
FIG. 2 is a block diagram of an example memory.

Referring to FIG. 1, an apparatus to connect with a wireless network is shown at 10. The apparatus 10 may include additional components, such as various additional interfaces and/or input/output devices such as displays to interact with a user. The apparatus 10 is to determine whether to connect to a wireless network. In the present example, the apparatus 10 includes a memory 15, a network interface 20, a network detector 25, and a processor 30. The processor 30 may be to operate a machine learning engine 35 as well as carry out a set of instructions to connect to a wireless network.

The memory 15 is coupled to the processor 30 and may include a non-transitory machine-readable storage medium that may be any electronic, magnetic, optical, or other physical storage device. In the present example, the memory 15 stores training data 50 in a database as well as rules 52 generated from the training data 50. The training data 50 may include data received from another computing device (not shown) as well as data collected by the apparatus 10. The memory 15 may also store executable instructions 54. In the present example, the executable instructions may include a set of instructions to detect a presence of a wireless network with a network detector, a set of instructions to generate rules based on training data and a machine learning engine, the rules to define conditions to activate a network interface in the presence of the wireless network, and a set of instructions to activate the network interface upon satisfaction of the conditions. These instructions may repeat in a loop and run in the background such that changes to the relative networks available to connect via the network interface 20.

The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to operate the network interface 20, the network detector 25, or other hardware in communication with the processor 30. In addition, the machine-readable storage medium may also be encoded with data to store generated rules subsequent use.

The memory 15 may also store an operating system that is executable by the processor 30 to provide general functionality to the apparatus 10, for example, functionality to support various applications such as a user interface to access various features of the apparatus 10. Examples of operating systems include Windows™, macOS™, iOS™, Android™, Linux™, and Unix™. The memory 15 may additionally store applications that are executable by the processor 30 to provide specific functionality to the apparatus 10, such as functionality to detect a location, to determine an orientation of the apparatus 10, or to sense a movement of the apparatus 10.

The network interface 20 is to communicate with a wireless network such as a Wi-Fi network. In the present example, the network interface 20 can be switched between one of two states. In a powered state, the network interface 20 may be connected to the wireless network to send and receive data over the wireless network. In a power-saving state, the network interface 20 is powered down to reduce power demands. With power demands reduced, the network interface 20 can improve the battery performance of the apparatus 10. For example, the power-saving state may be a powered down state where current is simply not provided to the network interface 20. In other examples, the power-saving state may be a sleep state where the network interface 20 has reduced functionality when portions of the network interface 20 are powered down, such as an antenna or amplifier circuitry.

In other examples, the two states of the network interface 20 may be software controlled such that a first state of the network interface 20 is one where the network interface is not permitted to connect to a wireless network despite availability, and the second state is one where the network interface 20 is permitted to freely connect to available wireless networks. In this example, the states of the network interface 20 are solely for the purpose of access control and does not address battery conservation issues.

In the power-saving state, the network interface 20 is not in communication with the wireless network. Accordingly, the apparatus 10 has no connection to any external networks via the network interface 20. In the present example, the apparatus may include an additional network interface (not shown) different from the network interface 20. The additional network interface may be used to connect to a network other than the wireless network with which the network interface 20 can communicate. For example, the network interface 20 can be used to communicate with a wireless network with a Wi-Fi standard (e.g. 802.11a, 802.11g, 802.11n, or 802.11ac) and the additional network interface (not shown) can be used to communicate with a cellular network standard. Therefore, the apparatus 10 can be provided with uninterrupted communication with an external network or device over the Internet.

The network detector 25 is not particularly limited and may include any device capable to detect the presence of a wireless network. For example, the network detector 25 can include a separate antenna to receive signals from a wireless network, such as a Wi-Fi network. In particular, the network detector 25 may be designed to receive and amplify signals at a certain wavelength and recognize the signals as data communication in accordance to a known standard of the wireless network.

As another example, the network detector 25 may be a part of the network interface, or a routine that is carried out by the network interface 20. In this example, the network interface can be in a sleep state and the network detector 25 can cause the network interface 20 to wake up and scan for the presence of wireless networks. In other examples, the network detector 25 can use one or more of global positioning coordinates, cellular location, neighboring Bluetooth device or NFC devices detect to identify locations where a wireless network is likely available. In addition, machine learning may be used to guess and identify possible neighboring wireless networks based on history of connections.

The processor 30 may include a central processing unit (CPU), a microcontroller, a microprocessor, a processing core, a field-programmable gate array (FPGA), or similar. The processor 30 and memory 15 may cooperate to execute various instructions. In this example, the processor 30 also maintains and operates a machine learning engine 35 to generate rules 52 with the training data 50 to be stored in the memory 15. In particular, the processor 30 may execute instructions stored on the memory 15 to implement the machine learning engine 35 and to collect analytics information from the apparatus 10 to provide to the machine learning engine. In other examples, the machine learning engine 35 may be substituted with an external engine, such as from a software as a service provider. In the present example, the rules 52 are used to determine if the network interface 20 is to be switched from the power-saving state to a powered state in the presence of the wireless network.

The processor 30 is also to control the network interface 20. In particular, the processor 30 may send instructions to the network interface 20 to control the state and to switch the network interface 20 between the powered state and the power-saving state. The manner by which the processor 30 switches the state of the network interface 20 is not particularly limited and may be based on manual instructions received from a user or based on the application of the rules 52 generated by the machine learning engine 35.

As an example of the implementation of the apparatus 10, it can be assumed that the training data 50 includes lists of wireless network identifiers, such as a service set identifier (SSID), and whether the apparatus 10 is to connect to each of the wireless networks. For example, the training data 50 can include known Wi-Fi hotspots with connectivity issues with which the network interface 20 is to avoid under certain circumstances. The training data 50 may include other factors associated with this specific hotspot, such as duration of time the apparatus 10 spends within range of the specific hotspot and/or a time of day. Accordingly, the machine learning engine can then generate a rule that the network interface 20 is not to be switched from a power-saving state to a powered state unless the apparatus 10 has been within range of the specific wireless network for more than 5 minutes during business hours. Under these conditions, it is likely that the apparatus 10 may benefit from a connection with the wireless network. Alternatively, if the conditions are not met, it can be assumed that the apparatus 10 is likely to move through the range of the wireless network and that the time required to establish the connection may not be worthwhile since the apparatus 10 may move out of range shortly after.

Figure 3:
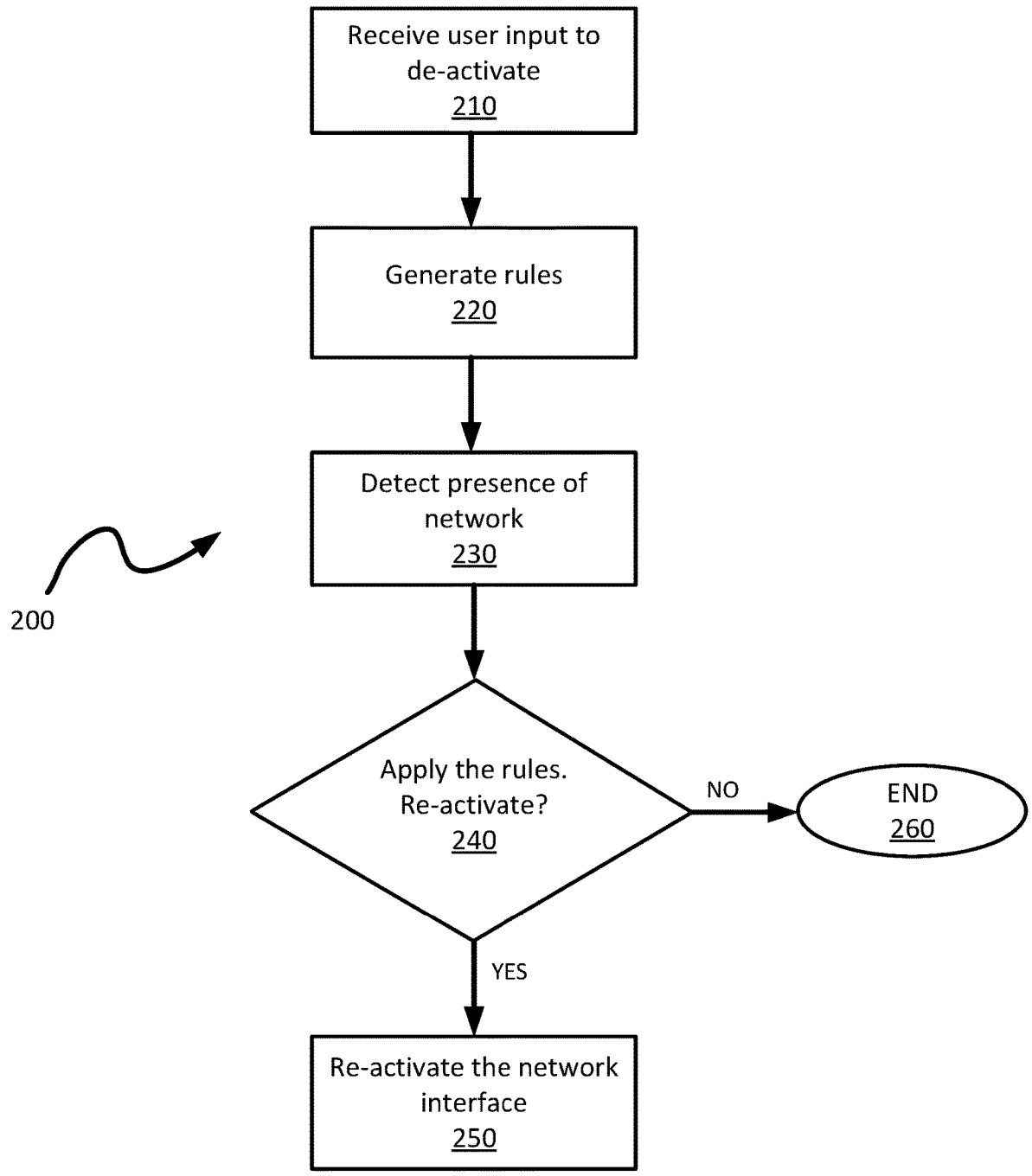
FIG. 3 is a flowchart of an example of a method.
Figure 4:
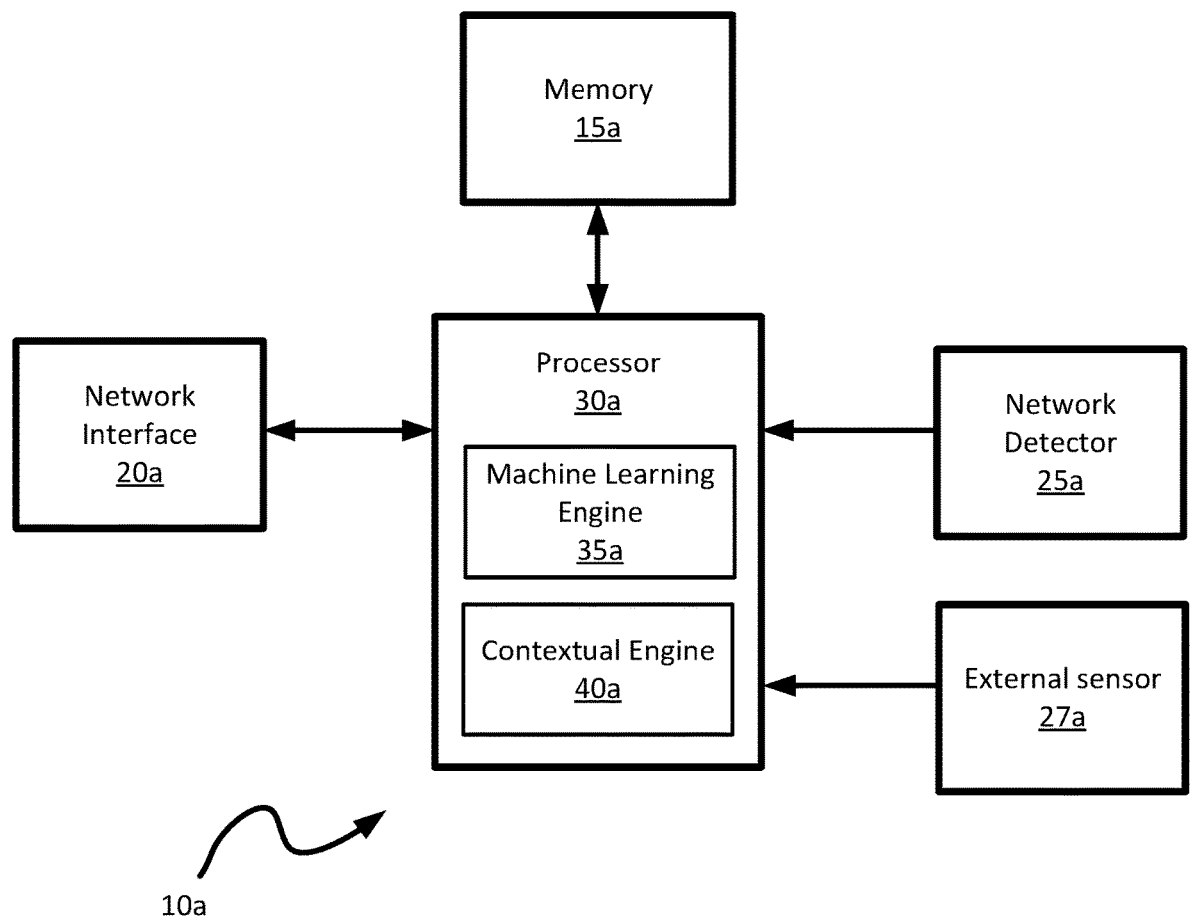
FIG. 4 is a block diagram of another example apparatus.

Referring to FIG. 3, a flowchart of a method to connect with a wireless network is shown at 200. In order to assist in the explanation of method 200, it will be assumed that method 200 may be performed with the apparatus 10, and specifically by the processor 30. Indeed, the method 200 may be one way in which apparatus 10 may be configured. Furthermore, the following discussion of method 200 may lead to a further understanding of the processor 30, and apparatus 10 and its various components. Furthermore, it is to be emphasized, that method 200 need not be performed in the exact sequence as shown, and various blocks may be performed in parallel rather than in sequence, or in a different sequence altogether.

Beginning at block 210, the processor 30 receives user input to de-active the network interface 20. The manner by which the user input is received is not particularly limited. In the present example, user input is received via a user input device, such as a touchscreen device (not shown). Upon the user input to de-active the network interface 20 being received, the processor 30 switches the network interface from the powered state to the power-saving state in the present example.

In this example, a user may effectively disconnect the apparatus 10 from a wireless network to which the apparatus 10 is connected. In general, when the network interface 20 of the apparatus 10 is in a powered state or activated, the network interface 20 automatically connects to at least some wireless networks. For example, the network interface 20 may automatically connect with known wireless networks to which the apparatus has previously connected. In other examples, the network interface 20 may attempt to connect automatically to all wireless networks when within range of the wireless network. A user may want to disconnect the apparatus 10 from the wireless network for several reasons. For example, the wireless network to which the apparatus 10 is connected may be unsecure or fail to provide sufficient connectivity. Another reason may be that the user is aware that the apparatus 10 is to leave range of the wireless network to avoid the apparatus 10 from losing and re-establishing another connection.

The machine learning engine 35 may record the execution of block 210 and add information associated with the execution of block 210 to the training data 50. The information may include the time at which the user de-activated the network interface 20, the location of the apparatus 10 (if available), movement of the apparatus 10, etc.

Block 220 involves the machine learning engine 35 generate rules 52 with the training data 50. The manner by which the rules are generated is not particularly limited. The rules are to determine if the network interface 20 is to be re-activate in the presence of a wireless network. In the present example, the machine learning engine 35 can apply various algorithms, such as statistical modeling or artificial neural network algorithms, to the training data 50 to generate a table of conditions for each known wireless network under which the network interface 20 is to be re-activated. In particular, predictive modeling based on analytics data collected by the apparatus 10 to solve a classification problem, such as to activate the network interface 20 or not.

Due to the heavy computational resources required to operate the machine learning engine 35, the machine learning engine 35 can be executed on a remote server (not shown) with more computational power or as a background process on the apparatus. Accordingly, the rules 52 generated in the form of tables or another searchable database allows the processor 30 to determine quickly where the network interface is to be re-activated.

Next, block 230 involves detection of the presence of a wireless network with the network detector 25. The manner by which the wireless network is detected is not limited. As an example, the network detector 25 can use the same hardware as the network interface 20 to collect information about available wireless networks within range of the apparatus 10 periodically. Accordingly, the network interface 20 may effectively be re-activated to detect available networks. In other examples, the network detector 25 can include separate hardware to sense available networks within range.

Block 240 involves application of the rules generated at block 220 to determine whether the network interface 20 is to be re-activated. Continuing with the present example, the wireless network detected by the network detector 25 is compared with the rules 52. If the application of the rules 52 indicates that the network interface 20 is to be re-activated, the method 200 proceeds to step 250 where the network interface 20 is re-activated, such as switched from the power-saving state to the powered state. If the application of the rules 52 indicate that the network interface 20 is not to be re-activated, such as to remain in the power-saving state, the method 200 proceeds to step 260 and ends without further action. In some examples, the method 200 can be modified to loop back to block 230 and continue to re-iterate upon detection of new wireless networks.

Referring to FIG. 3, another example of an apparatus to connect with a wireless network is shown at 10a. Like components of the apparatus 10a bear like reference to their counterparts in the apparatus 10, except followed by the suffix "a". The apparatus 10a includes a memory 15a, a network interface 20a, a network detector 25a, an external sensor 27a, and a processor 30a. The processor 30a may be to operate a machine learning engine 35a and a contextual engine 40a as well as carry out a set of instructions to operate the apparatus 10a in general. Furthermore, the apparatus 10a is another example that may be used to carry out the method 200.

The memory 15a is coupled to the processor 30a and may include a non-transitory machine-readable storage medium that may be any electronic, magnetic, optical, or other physical storage device. In the present example, the memory 15a stores training data in a database as well as rules generated from the training data. The training data may include data received from another computing device (not shown) as well as data collected by the apparatus 10a. The memory 15a may also store executable instructions to operate various components of the apparatus 10a. In the present example, the executable instructions may include a set of instructions to detect a presence of a wireless network with a network detector, a set of instructions to generate rules with training data and a machine learning engine, the rules to define conditions to activate a network interface in the presence of the wireless network, and a set of instructions to activate the network interface upon satisfaction of the conditions. These instructions may repeat in a loop and run in the background such that changes to the relative networks available to connect via the network interface 20a.

The non-transitory machine-readable storage medium may include, for example, random access memory (RAM), electrically-erasable programmable read-only memory (EEPROM), flash memory, a storage drive, an optical disc, and the like. The machine-readable storage medium may be encoded with executable instructions to operate the network interface 20a, the network detector 25a, or other hardware in communication with the processor 30a. In addition, the machine-readable storage medium may also be encoded with data to store generated rules subsequent use.

The network interface 20a is to communicate with a wireless network such as a Wi-Fi network. The network interface 20a can be switched between one of two states: a powered state and a power-saving state.

The network detector 25a is not particularly limited and may include any device capable to detect the presence of a wireless network. For example, the network detector 25a can include a separate antenna to receive signals from a wireless network, such as a Wi-Fi network. In particular, the network detector 25a may be designed to receive and amplify signals at a certain wavelength and recognize the signals as data communication in accordance to a known standard of the wireless network.

As another example, the network detector 25a may be a part of the network interface, or a routine that is carried out by the network interface 20a. In this example, the network interface can be in a sleep state and the network detector 25a can cause the network interface 20a to wake up and scan for the presence of wireless networks.

The external sensor 27a is to detect a condition of the apparatus 10a. The condition detected is not particularly limited and is generally to be at least a portion of the context data considered by the contextual engine 40a. For example, the external sensor 27a may be a location sensor, such as a global position system (GPS), to locate the apparatus 10a. Accordingly, the location measured by the GPS can be a coordinate and be the condition detected. As another example, the external sensor 27a may be a motion sensor, such as an accelerometer or a gyroscope, to detect motion of the apparatus 10a. The detected motion can be used to indicate an activity to represent a condition of the apparatus 10a. In particular, if the external sensor 27a detects that the apparatus 10a moves in a manner consistent with running, driving, cycling, or otherwise in motion, the network interface 20a may be best left in a power-saving state since the apparatus 10a will likely leave the range of the wireless network. This type of condition can occur as a jogger passes by a store with an available wireless network.

The processor 30a may include a central processing unit (CPU), a microcontroller, a microprocessor, a processing core, a field-programmable gate array (FPGA), or similar. The processor 30a and memory 15a may cooperate to execute various instructions. In this example, the processor 30a also maintains and operates a machine learning engine 35a and a contextual engine 40a. In particular, the processor 30a may execute instructions stored on the memory 15a to implement the machine learning engine 35a and/or the contextual engine 40a. In other examples, the machine learning engine 35a and the contextual engine 40a may each be substituted with an external engine, such as from a software as a service provider.

The contextual engine 40a is to collect and process context data about an environment in which the apparatus 10a is located. The context data may be used by the processor 30a to determine whether to switch the network interface 20a from the power-saving state to the powered state. In the present example, the context data may include network identifiers, such as a network address or SSID, of any wireless network within range of the network detector 25a. The context data may further include signal strength information about wireless networks within range of the network detector 25a. Further examples of context data may include the data collected from the external sensor 27a. In other examples, context data may also include data from clock to determine time of day as well as battery gauge from battery drivers.

In the present example, the context data provides information for the processor 30a to make a determination, such as that outlined in block 240 of the method 200. Application of the rules may involve evaluation of the context data provided by the contextual engine 40a. For example, the context data provided by the contextual engine 40a can indicate the presence of multiple wireless networks with variable signal strengths. This may indicate that the apparatus 10a moved between various wireless network access points (such as in a shopping mall or other location with a high density of wireless networks). Application of the rules may result in a determination to not switch the network interface 20a from a power-saving state to a powered state since the repeated connections and disconnections may reduce the overall performance of the apparatus 10a and consume additional power.

The contextual engine 40a may also administer control of the data to be included in context data based on user preferences or permissions. For example, the contextual engine 40a may limit access to one or more component of the apparatus 10a, such as the external sensor 27a, for privacy or other reasons. If access to the external sensor 27a is limited the context data can be modified accordingly to exclude any information collected by the external sensor 27a.

It should be recognized that features and aspects of the various examples provided above may be combined into further examples that also fall within the scope of the present disclosure.

What is claimed is:

1. An apparatus comprising:
a memory to store training data and rules;
a network interface to communicate with a wireless network, wherein the network interface is in one of a powered state or a power-saving state;
a network detector to detect a presence of the wireless network;
a machine learning engine in communication with the memory, the machine learning engine to:
record user input to de-activate the network interface and add information associated with the network interface de-activation to the training data; and
use the training data to generate the rules, the rules to determine if the network interface is to be switched from the power-saving state to the powered state in the presence of the wireless network; and
a processor in communication with the memory, the network interface, and the network detector, the processor to switch the network interface from the power-saving state to the powered state based on the rules.

2. The apparatus of claim 1, comprising an contextual engine, wherein the contextual engine collects context data about an environment, wherein the processor uses the context data to determine whether to switch the network interface from the power-saving state to the powered state.

3. The apparatus of claim 2, wherein the context data includes a network address of the wireless network obtained from the network detector.

4. The apparatus of claim 3, wherein the context data includes a signal strength of the wireless network obtained from the network detector.

5. The apparatus of claim 2, comprising an external sensor to detect a condition, the condition to be a part of the context data.

6. The apparatus of claim 5, wherein the external sensor is a location sensor and wherein the condition is a location of the apparatus.

7. The apparatus of claim 5, wherein the external sensor is a motion sensor to detect motion of the apparatus, wherein the motion is indicative of an activity associated with a user, and wherein the condition is the activity.

8. A non-transitory machine-readable storage medium encoded with instructions executable by a processor, the non-transitory machine-readable storage medium comprising:
instructions to detect a presence of a wireless network with a network detector;
instructions to record user input to de-activate a network interface connected to the wireless network and add information associated with the network interface de-activation to training data;
instructions to generate rules using the training data and a machine learning engine, the rules to define conditions for activating the network interface in the presence of the wireless network; and
instructions to activate the network interface upon satisfaction of the conditions.

9. The non-transitory machine-readable storage medium of claim 8, comprising instructions to collect context data about an environment via a contextual engine, wherein the context data is to determine whether to activate the network interface.

10. The non-transitory machine-readable storage medium of claim 9, wherein the context data includes a network address of the wireless network obtained from the network detector.

11. The non-transitory machine-readable storage medium of claim 9, comprising instructions to detect a condition with an external sensor the condition to be a part of the context data.

12. The non-transitory machine-readable storage medium of claim 11, wherein the condition is a location of detected with a location sensor.

13. A method comprising:
receiving user input to de-activate a network interface;
adding information associated with the network interface de-activation to training data;
generating rules using the training data and a machine learning engine, the rules to determine if the network interface is to be re-activated in a presence of a wireless network;

detecting the presence of the wireless network with a network detector;
applying the rules, upon detecting the presence, to a condition; and
re-activating the network interface based on application of the rules.

14. The method of claim 13, comprising detecting the condition using an external sensor.

15. The method of claim 14, wherein the external sensor is a location sensor and wherein the condition is a location of a mobile computing device.

* * * * *